Figure 1:
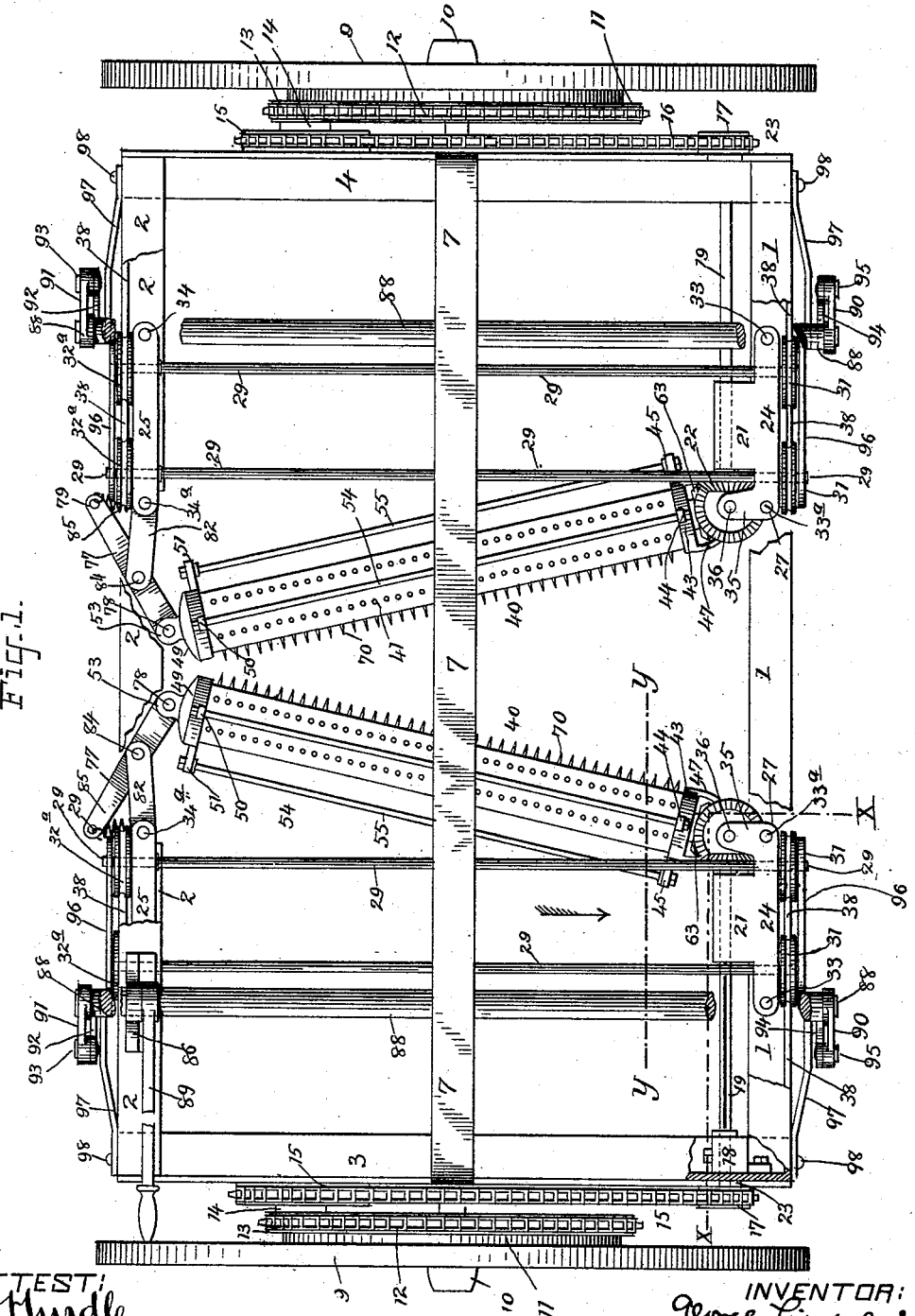

(No Model.) 9 Sheets—Sheet 1.

G. LISPENARD.
COTTON HARVESTER.

No. 494,105. Patented Mar. 21, 1893.

ATTEST:
J. H. Hurdle
M. E. Stoddard

INVENTOR:
George Lispenard
by Joseph L. Leo
atty (No Model.)　　　　　　　G. LISPENARD　　　9 Sheets—Sheet 3.
COTTON HARVESTER.

No. 494,105.　　　　　　　Patented Mar. 21, 1893.

ATTEST:　　　　　　　　　　　　　　　INVENTOR:

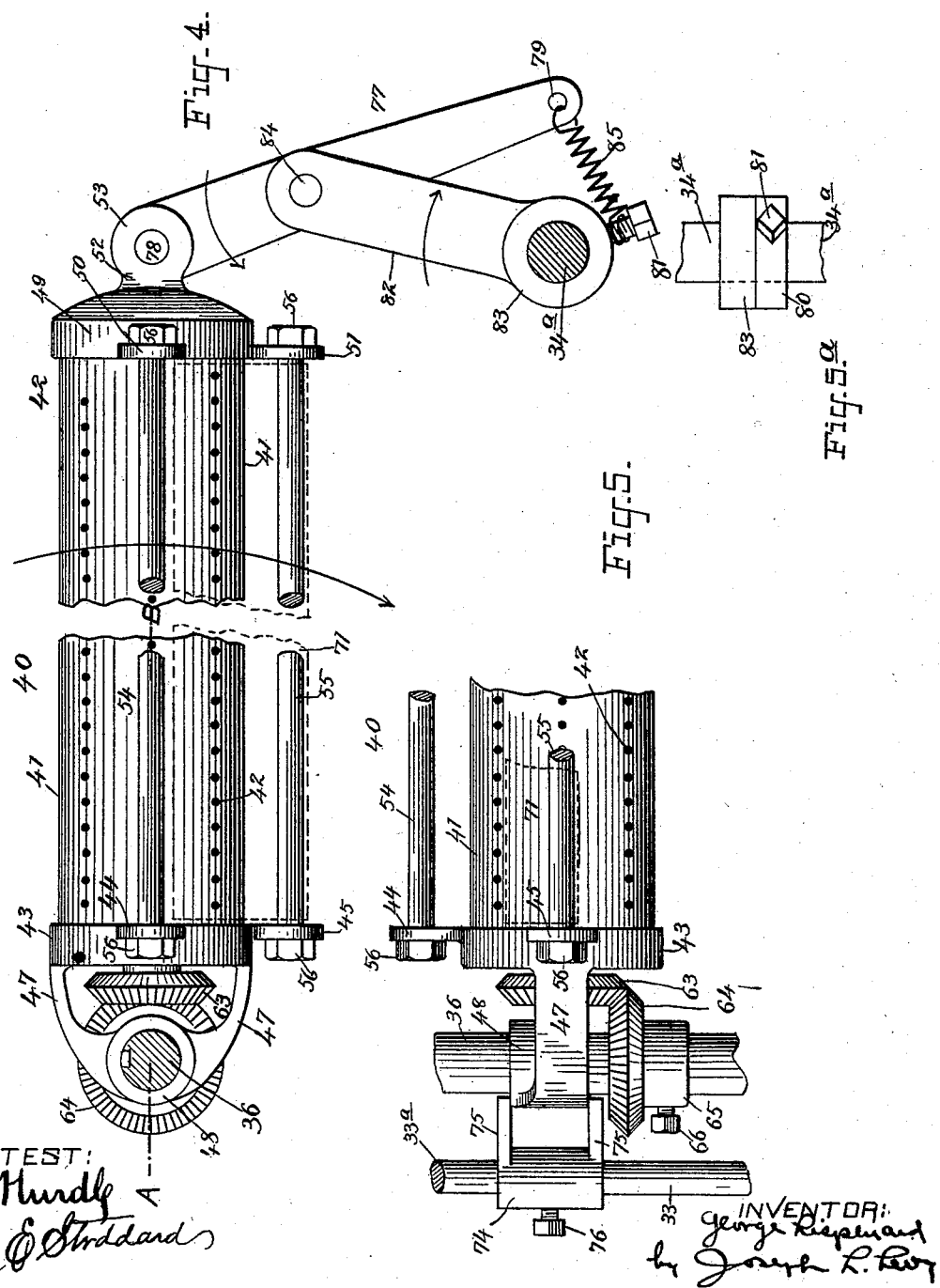

(No Model.) 9 Sheets—Sheet 5.
G. LISPENARD.
COTTON HARVESTER.
No. 494,105. Patented Mar. 21, 1893.
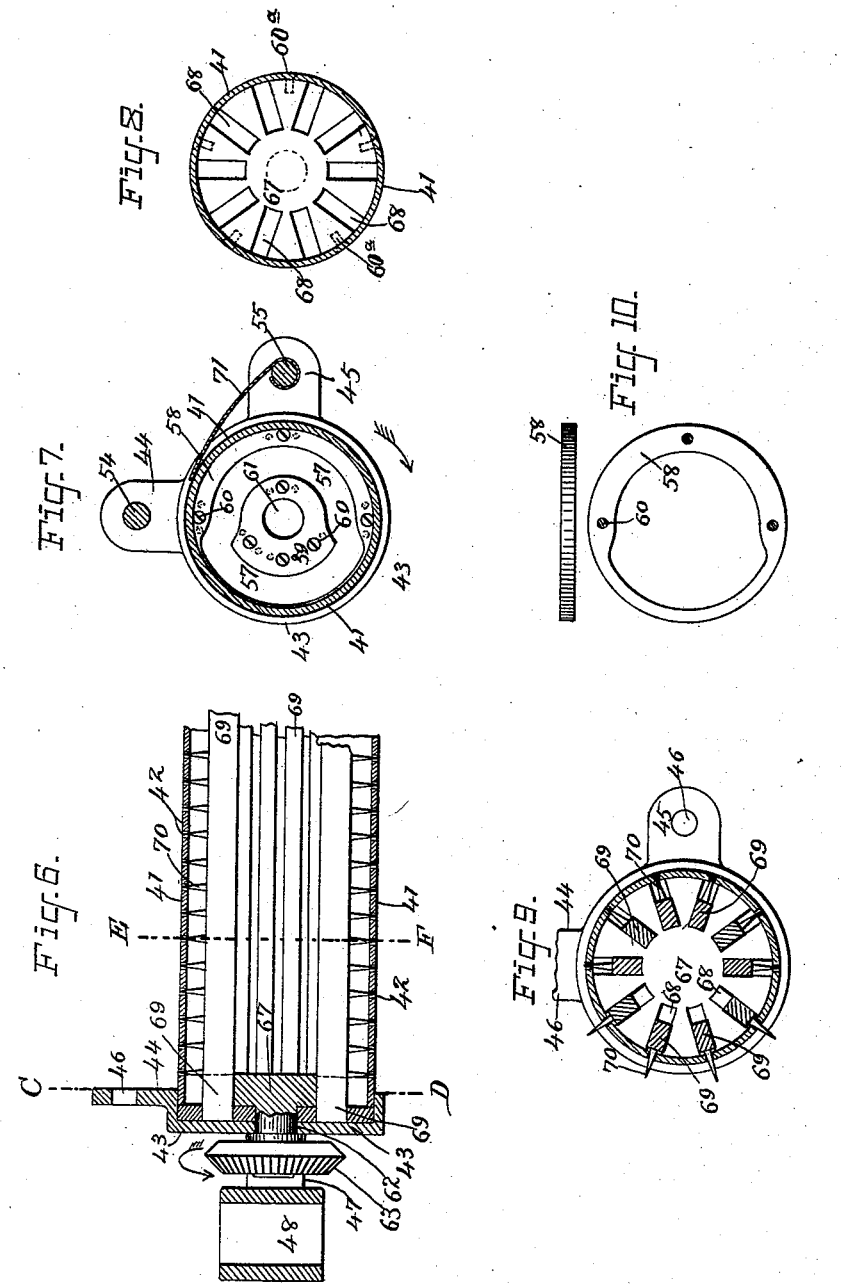
ATTEST:
J. A. Hurdle
M. E. Stoddard
INVENTOR:
George Lispenard
by Joseph R. Levy
Atty.

(No Model.) 9 Sheets—Sheet 6.

G. LISPENARD.
COTTON HARVESTER.

No. 494,105. Patented Mar. 21, 1893.

Fig. 11ˣ.

ATTEST:
M. E. Stoddard
H. F. Durbin

INVENTOR:
George Lispenard
By Joseph L. Levy
Attorney (No Model.) 9 Sheets—Sheet 7.
G. LISPENARD.
COTTON HARVESTER.

No. 494,105. Patented Mar. 21, 1893.

ATTEST:
M. E. Stoddard
H. F. Dunbar

INVENTOR:
George Lispenard
By Joseph L. Levy
Attorney (No Model.) 9 Sheets—Sheet 8.

G. LISPENARD.
COTTON HARVESTER.

No. 494,105. Patented Mar. 21, 1893.

ATTEST:
M. E. Stoddard.
H. F. Dunhur.

INVENTOR:
George Lispenard
By Joseph L. Levy
Attorney (No Model.)　　　　　　G. LISPENARD.　　　9 Sheets—Sheet 9.
COTTON HARVESTER.
No. 494,105.　　　　　　　　　Patented Mar. 21, 1893.
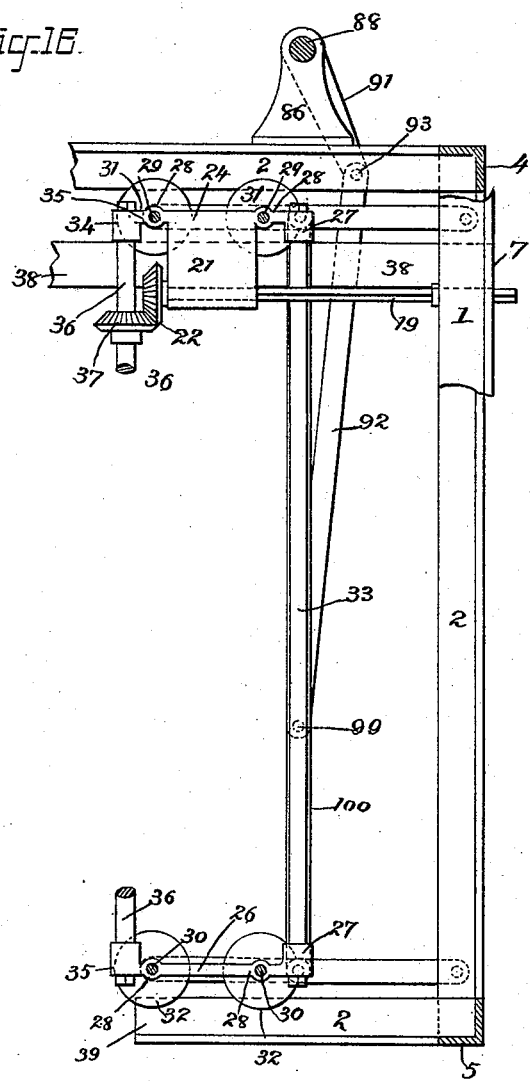
ATTEST:
M. E. Stoddard
H. F. Auten
INVENTOR:
George Lispenard
By Joseph L. Levy
Attorney

UNITED STATES PATENT OFFICE.

GEORGE LISPENARD, OF BROOKLYN, NEW YORK, ASSIGNOR, BY MESNE ASSIGNMENTS, TO WALLIS-LISPENARD COTTON PICKER AND MACHINERY COMPANY, OF NEW JERSEY.

COTTON-HARVESTER.

SPECIFICATION forming part of Letters Patent No. 494,105, dated March 21, 1893.

Application filed August 13, 1891. Serial No. 402,518. (No model.)

*To all whom it may concern:*

Be it known that I, GEORGE LISPENARD, a citizen of the United States, residing at Brooklyn, county of Kings, and State of New York, have made certain new and useful Improvements in Cotton-Harvesters, of which the following is a specification.

My invention has reference to that class of cotton harvesters, which employ rotating or reciprocating picker stems, arranged in a movable frame on each side of the machine, so that the rows of cotton plants may be straddled, the pickers operating upon the plants on each side thereof.

My invention has special reference to the class of harvesters before described, in which the picker stems are arranged to form two upright walls, diverging from a common center.

A very important feature of my invention consists in making each picker stem itself independently movable, so that any one of the picker stems on either side may be brought toward the field of operation or retired therefrom without giving to any one of the other picker stems a like movement. This capability is a very valuable feature, because by it the operator is enabled to bring the picker stem, which is in line with the full grown or developed cotton bolls into action for picking the cotton, leaving the other picker stems which are in line with that portion of the bush whereon there are no ripe bolls, retired, and in a position where they will not come in contact with the unripe bolls or bush. By means of this two-fold use, that is the independent operation of one of the series of cotton pickers, and individual operation of each picker stem the operation of picking cotton is brought nearer to the action of manual labor than is possible with any machine which has been hitherto constructed, so far as I know.

My invention further consists in the details of construction of both the picker stem and general organism of the machine.

Figure 2:
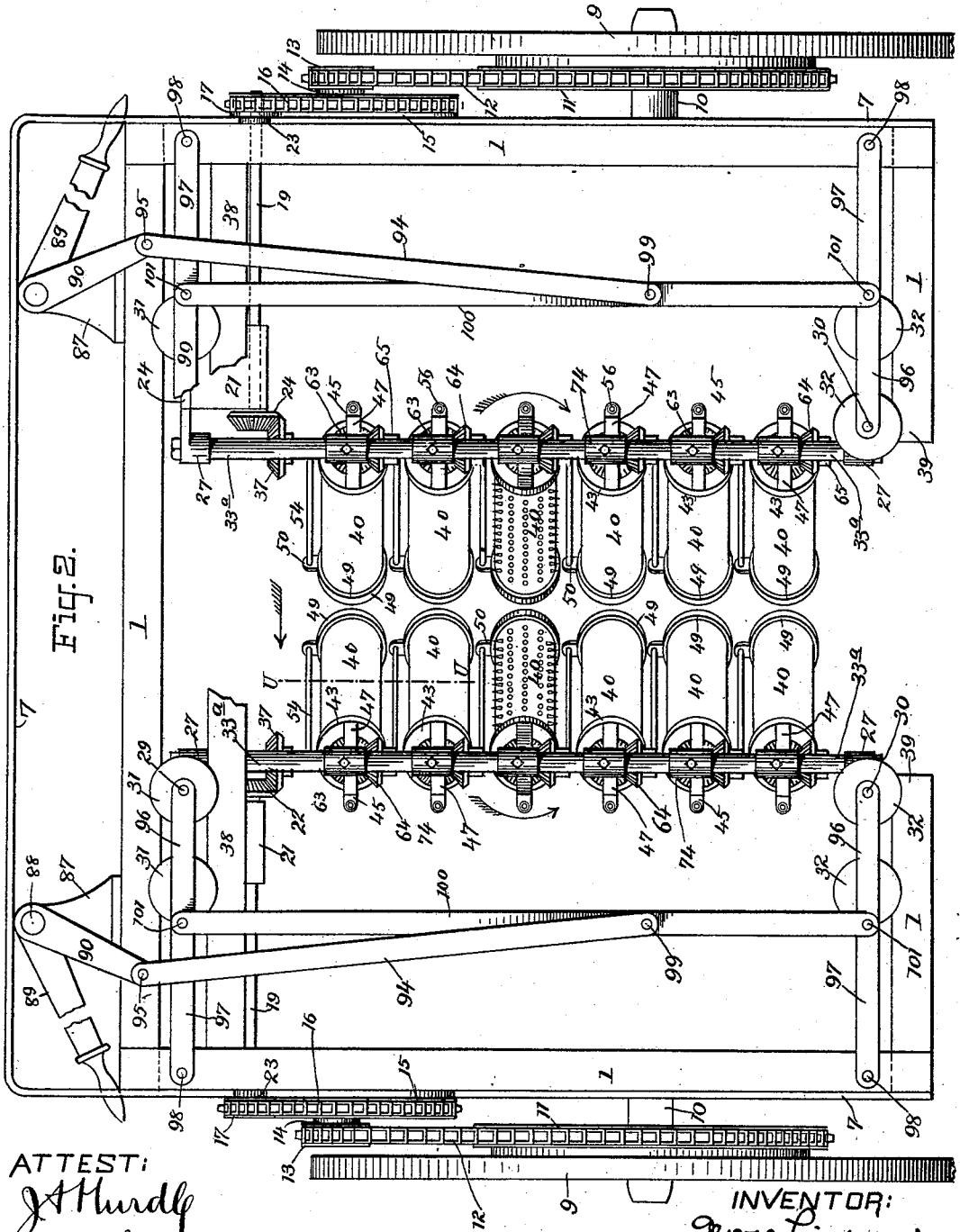
Figure 3:
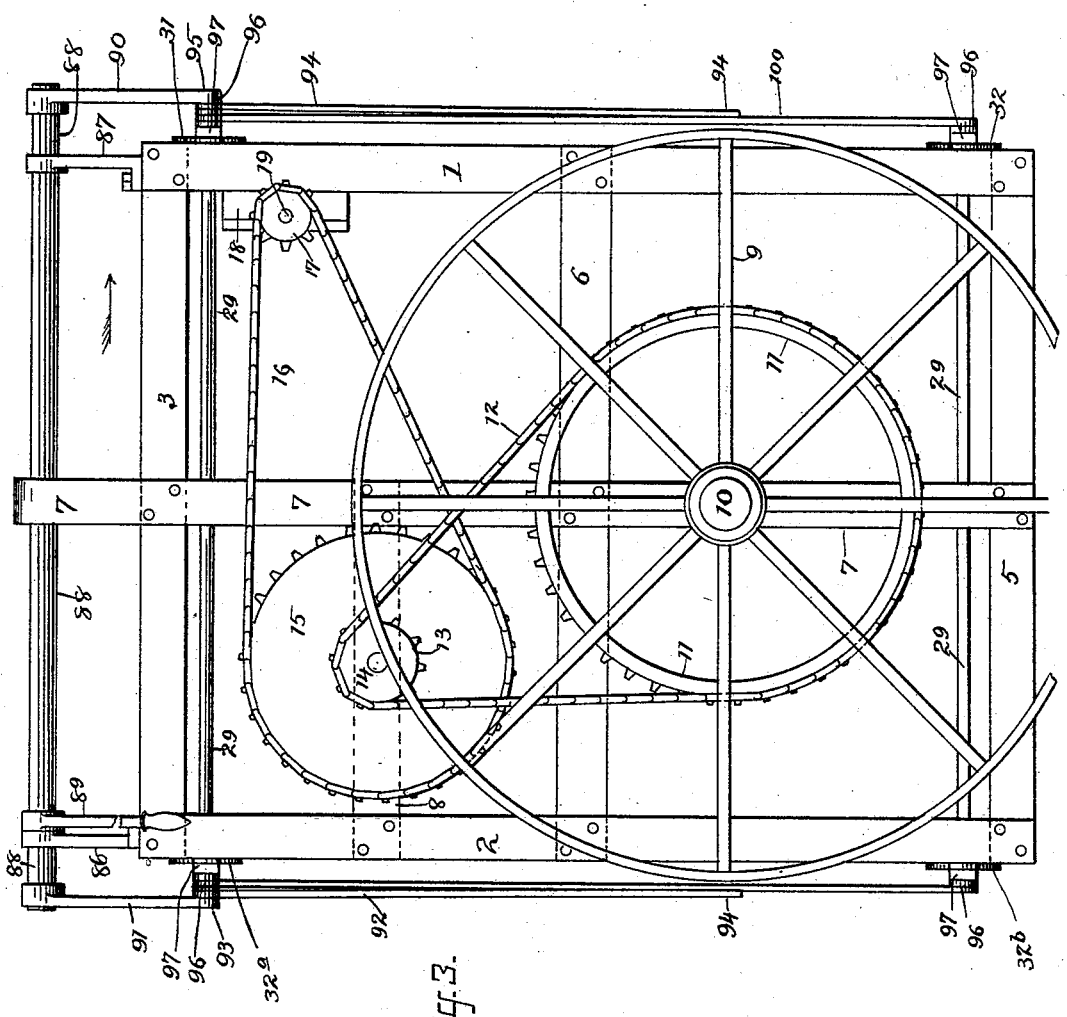
Figure 11:
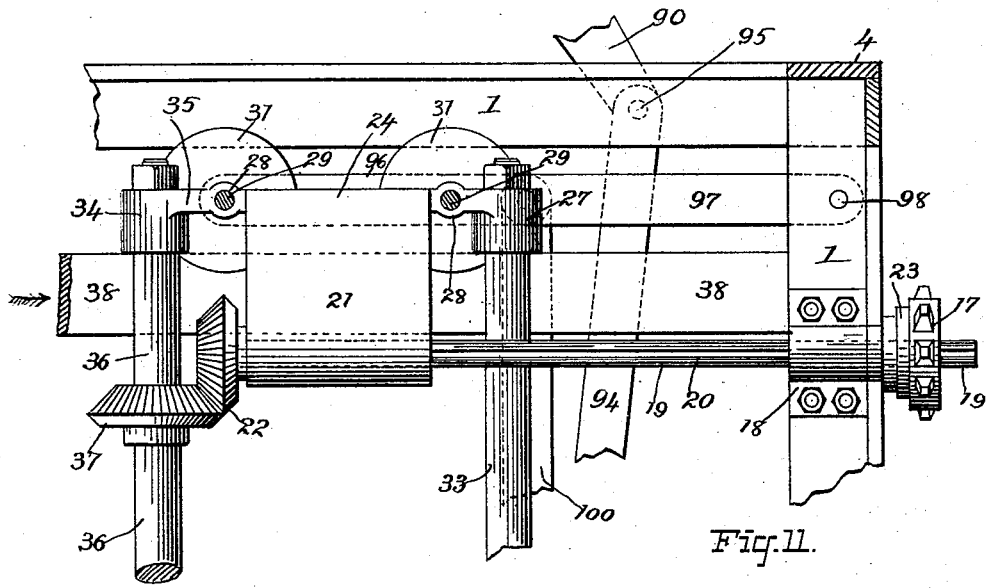
Figure 12:
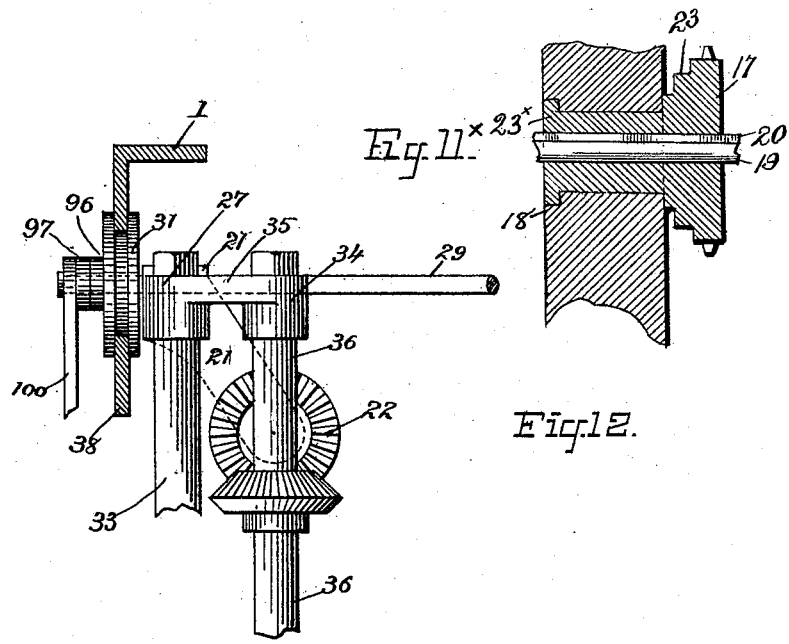
Figure 13:
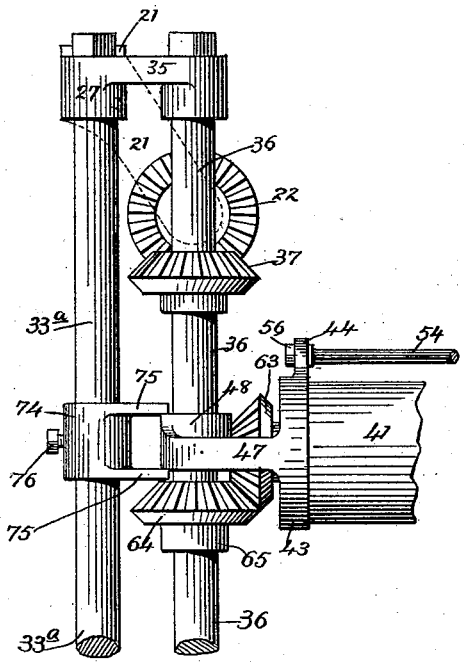
Figure 14:
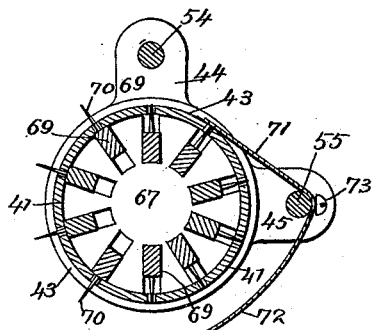
Figure 15:
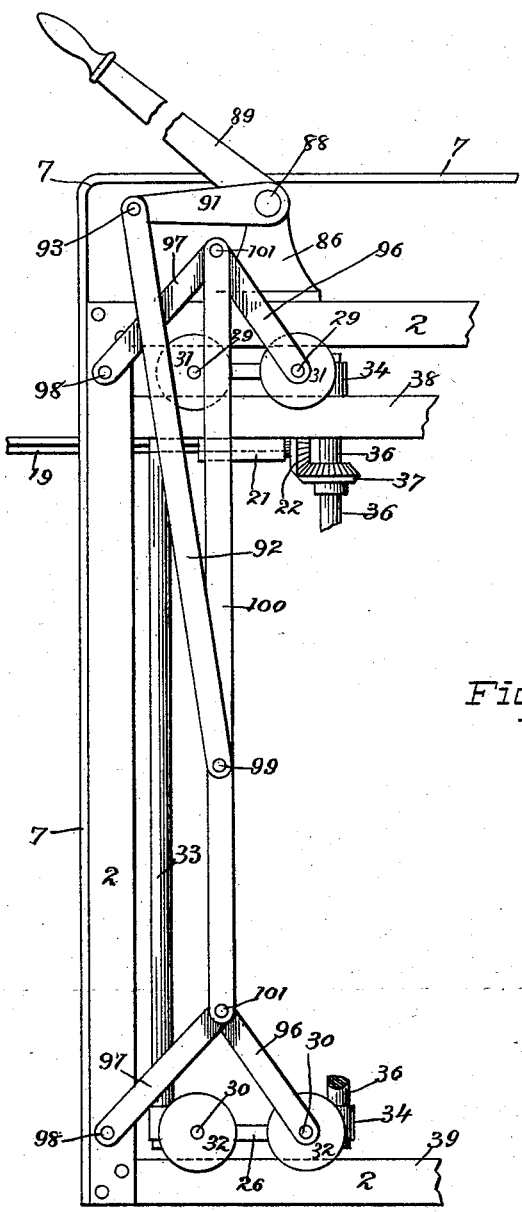

In the drawings, Figure 1 is a plan view of a harvester, certain parts being broken away for the sake of clearness, the top of the machine in this view being the rear and the bottom the front. Fig. 2 is a front elevation of the harvester, portions of the framing broken away for the sake of clearness; but two of the picker stems are shown with projecting hackle pins, the construction of all of them being identical; Fig. 3, a side elevation of the frame and picker operating instrumentalities, the pickers being omitted for the sake of clearness in illustration. Fig. 4 is a plan view of an individual picker stem, enlarged, showing its method of support, and lever connections whereby it is made independently operative and adjustable; Fig. 5, a side elevation of the left hand end of Fig. 4 showing the additional feature of an individual support for each individual picker stem, whereby the weight of all the stems is not thrown upon the gearing, but taken up by this individual support. Fig. 5ª is a side elevation showing the means of supporting the rear end of the picker stem; Fig. 6, an enlarged sectional elevation, taken approximately on the line A, B, Fig. 4; Fig. 7, a sectional elevation, taken approximately on the line C, D, Fig. 6, the slotted-head and hackle-bars being removed; Fig. 8, a cross-section of the picker stem taken approximately on the line C, D, Fig. 6, showing the slotted-head therein, the cylinder-head being removed; Fig. 9, a cross-section taken on the line E, F, Fig. 6, showing the hackle-bars in operation; Fig. 10, a plan and side elevation respectively of the outer cam-ring; Fig. 11, an enlarged section and elevation of a part of the picker operating devices, taken approximately on the line x, x, Fig. 1, looking in the direction of the arrow. Fig. 11ˣ is a detail sectional view of parts of Fig. 11; Fig. 12, a side elevation and section of Fig. 11, looking in the direction of the arrow. Fig. 13, an enlarged detail side elevation of a portion of the picker stem, showing the upper portion of one end thereof, the picker stem being broken away on the line U, U, Fig. 2, the view being taken in the direction of the arrow, same figure; Fig. 14, an enlarged sectional elevation of two superposed picker stems and a part of the third, showing an arrangement of deflectors and guards, taken on the line U, U, Fig. 2; Fig. 15, a front elevation of one end of the main frame and a picker frame, and devices for moving the picker frame, the picker stems and adjustment bar being omitted, the picker frame moving devices being shown in a withdrawn position; Fig. 16, a vertical section of one side of the frame, showing the picker carriage, said section being taken approximately on the line y, y, Fig. 1.

Like numerals of reference refer to like parts throughout the several views.

I shall first describe the main frame of the machine, which frame supports the movable picker frame and motive connections with the propelling wheels.

Two rectangular frames 1 and 2 form the main members of the frame and are disposed at the front and rear thereof respectively. The lower central section of both members is left open so as to permit the cotton bush to pass centrally through the frame. These members may be either welded at their angles, or bolted together, and are preferably made of angle iron. Braces 3, 4 of angle iron unite the front and rear members 1, 2 at the top, and like braces 5 (but one of which is shown in the drawings, to wit: Fig. 3) secure the lower portions of the members 1 and 2. A central brace 6 secures the front and rear members 1 and 2 in the center thereof on each side (but one of which is shown). An arch bar 7 extends entirely about the frame, the downwardly extending portions of which are secured respectively with the cross-braces 3, 4, 5, 6, the upper or arched portions of which extends some distance above the top of the frame proper. This bar serves as a brace for the entire frame besides forming a means of support for the propelling wheels and attached devices. A bar 8 extends between the main section 2 and center brace 7 and is secured thereto, in which is formed bearings for power conveying devices. The frame thus constructed is very light and strong and of convenient shape.

The propelling wheels 9 upon which the main frame rests, are secured in suitable bearings in the center brace 7 by the axle 10. From the sprocket wheel 11, secured to the wheel 10, a sprocket chain 12 is led to and over a reducing sprocket wheel 13 secured upon a shaft 14, having bearings in the bar 8. A larger sprocket wheel 15 is secured upon the shaft 14 and to it rotary motion is given by the sprocket wheel 13. A sprocket chain 16 leads from the sprocket wheel 15 around a smaller sprocket wheel 17 suitably secured in bearings 18, fixed to the frame. A feathered shaft 19 having a feather 20 is rotatably secured within the hanger 21, said shaft having a miter wheel 22 on its end. The shaft 19 moves with the hanger 21 and the sprocket wheel 17 is interiorly slotted to permit the feather 20 of the shaft 19 to work within it in the usual manner, the sprocket wheel 17 having the collar 23, Fig. 11, and a sleeve 23$^x$ integral with said collar enters the bearings 18 and is secured therein, so as to permit the sprocket wheel to rotate, but not to travel with the shaft 19.

The foregoing describes the power creating and transmitting devices for the harvester. Motion is given to the picker stems by means of the miter wheel 22 of the shaft 19, which is connected to the power wheel 9 by sprocket wheels and chains. As this mechanism is duplicated on both sides of the machine, a description of that on one side is sufficient.

The movable picker stem frame is constructed as follows: It comprises the top front cross-heads 24 and the top rear cross heads 25, the bottom front cross head 26, and the bottom rear cross head which is directly below the top rear cross head 25, said last cross head not being shown, but which will be known as 26 also. The cross head 24 has the bracket 21 cast integral with it, and has downwardly extending bosses 27, as have all the other cross heads. The cross heads have bearings 28 for the transverse extending shafts 29, 30, the shafts 29 extending across and uniting the front and rear top cross heads, and the shafts 30 likewise extending across and uniting the front and rear bottom cross heads. The outer ends of the transverse shafts are provided with rollers 31, 32 at the front side, top and bottom respectively, and with rear rollers 32$^a$ at the top and bottom respectively. Secured within the bosses 27 are upright rods 33, 34, the rods 33 being secured to the rear front heads, and the rods 34 to the rear cross heads.

The rear part of the movable picker frame is constructed substantially the same as the front portion thereof, and it is not necessary to illustrate the details.

The cross heads 24, 26 have inwardly extending arms 35 in which the upright shaft 36 is rotatably secured. This shaft carries a miter wheel 37 in gear with the miter wheel 22 on the shaft 19. The bar 38 is secured to the downwardly extending portions of the members 1 and 2 of the main frame, so as to form guides for the upper rollers 31, 32$^a$, while the lower inwardly extending portion 39 of the members 1 and 2 forms the guide for the lower rollers 32, the upper set of rollers working within the longitudinal section of the main members and the bar 38 and the rollers 32 resting simply on the guide 39. By this arrangement the picker frame can be moved toward or from the center of the machine, or toward the cotton bush carrying with it the shaft 19, so that while said shaft is being rotated and rotation imparted to the upright shaft 36, the picker frame can be moved back and forth without interfering with such rotation. The picker stems 40 are supported at their rear, through the intervention of levers hereinafter described, by the inner upright bar 34$^a$. The front end of the picker stems are supported on the shaft 36 through the instrumentality of devices carried by the upright bar 33$^a$, all of which will be hereinafter described.

Each picker stem being constructed identical, a description of one will suffice. It comprises an outer cylindrical shell 41 with perforations 42 adapted to rotate within what I shall call outer and inner cylinder heads. The outer cylinder head 43 is recessed, as shown in section in Fig. 6, and has outwardly extending arms 44, 45 provided with holes 46. The head 43 has an outwardly extending yoke 47, provided with a centrally located collar 48, through which the shaft 36 passes and about which the collar is free to rotate. The rear head 49 has arms 50, 51 similar to the arms 44 on the front head 43, and has an outwardly extending lug 52 with an eye 53 formed thereon. Rods 54, 55 are secured to the arms on the front and rear cylinder heads respectively by nuts 56, both rods securing the cylinder 41 within the cylinder heads, the rod 54 being placed over the top of the cylinder for the purpose of preventing pods, leaves or twigs from being carried around by the hackle-pins, and the rod 55 being placed at one side of the cylinder, and upon which the deflector and guard are secured as hereinafter set forth. The cam-way 57 is formed on the inner face of both of the heads by securing thereto the outer cam-ring 58 and the inner cam-ring 59, both rings being secured to the heads by the screws 60, the inner cam-ring having an aperture 61. Instead of using screws 60 for securing the cam-rings to the heads, said rings may be secured in the heads by means of screws disposed as at $60^a$, Fig. 8. A short spindle 62 passes through an aperture in the end of the head 43, having on its outer end a miter wheel 63, which meshes with the miter wheel 64 on the shaft 36. The miter wheel 64 has a sleeve 65 through which the shaft 36 passes and a set screw 66 for securing the sleeve and miter wheel to the shaft 36. On the inner end of the spindle 62 is a disk 67, preferably formed integral with the spindle 62. This disk extends at right angles to the spindle 62, and is provided with a series of radially extending slots 68. This disk I shall hereinafter call the slotted head, and one is placed within each cylinder-head. Within the radial slots 68 in the slotted heads at both ends of the cylinder, are placed hackle-bars 69 preferably rectangular in cross-section, and which are provided with radially extending hackle-pins 70, so located that they may be projected out and withdrawn through the apertures or perforations 42 in the cylinder 41. By the rotation of the miter wheel 63, the slotted head is rotated and with it the hackle bars 69, like motion being communicated to the slotted head at the other end of the cylinder. During this rotation the ends of the hackle bars work within the cam-way 57, located at both ends of the cylinder and project and withdraw the hackle-pins.

By reference to Fig. 9, it will be seen that the hackle-pins are entirely projected on one side, and withdrawn within the periphery of the cylinder 41 on the other side, and at all times during the rotation of the hackle-pins, one portion thereof is in contact with the cylinder 41, so that as the hackle-pins rotate, the cylinder 41 rotates with them, the said cylinder acting as a cleaner to strip the cotton from the hackle-pins.

By reference to Fig. 7, it will be seen that the cam-plates 58, 59 are adjustable, as the cam-way 57 is formed by the cam-plates which are detachable from the heads 43, 49, and by means of such detachability their relative positions within the heads can be changed, so that the hackle-pins can be projected or withdrawn at any point about the cylinder if desired, but I prefer their position illustrated in Fig. 9, wherein the withdrawal of the pin commences as they approach the rod 54, and their projection commences as they pass outwardly from the perpendicular axis of the cylinder below the rod 54, so that the pins will be drawn from contact with the cotton during their inward rotation, and also that the bar 54 will co-operate with such withdrawal to prevent pods, leaves, twigs, &c., from passing beyond it, should they be picked up by the hackle-pins.

The deflector 71 is secured at one end to the bar 55, the other end resting on the periphery of the cylinder 61. This deflector is used for the purpose of lifting the cotton from the cylinder and passing it out from the field of rotation of the hackle pins. The deflector 71 may be loosely secured to the rod 55, so as to be thrown out of action if desired. This deflector may be made integral with a guard 72, Fig. 14, and the deflector 71 and guard 72 secured to the rod 55 by the screw 73. The function of the guard 72 is to close the opening between the cylinder 41 and the bar 52, when two picker stems are superposed, so as to prevent foreign bodies passing through.

The upright rod $33^a$ which is secured to the cross-heads 24 carries jaws 74, having outwardly extending fingers 75. These jaws are provided with a set screw 76 by means of which said jaw is rigidly secured to the rod $33^a$. These jaws support the front end of the picker stem by reason of the collar 48 on the yoke 47 passing within the fingers 75 thereof, and take the weight of each picker stem from off the shaft 36 and its gearing, and bring such strain upon the rod $33^a$ which is fixed, and as the miter wheel 65 is adjustable on the shaft 36, and the jaw 74 adjustable on the rod $33^a$, the front end of the picker therefore can be raised up and down in order to bring the picker stem into a position to enable it to pick cotton at various points on the bush, or in other words, the front end of the picker stem is provided with devices whereby the point of application of the picker stem to the bush may be changed at will. This is also true of the rear end as will be hereinafter set forth.

As before stated the rear end of the picker stem is provided with an outwardly extending lug 52, having an eye 53 formed thereon. Extending from the eye 53 is a lever 77 united to the eye by the pin 78, the outer end of said lever being provided with a hole 79. Upon the rod 34ª is secured a collar 80 by means of the set screw 81. A lever 82 ending in the collar 83 which passes around the rod 34ª, is pivotally secured to the lever 77 by the pin 84. Between the set screw 81 on the collar 80, and the hole 79 in the end of the lever 77 extends a spiral spring 85, which normally tends to press the rear end of the picker stem to its position of utmost extension, but which should be so regulated that it will permit the picker stem to give, when such stem meets with any abnormal obstacle, as for instance, a cotton bush thicker or wider than that for which the machine is set to operate upon, in which case if the same was not capable of giving, it would tear and injure the plant. This is only one instance of where the bush itself or the cotton bolls, &c., act to press in the picker stem, when either of them form an abnormal obstruction. This arrangement besides making the stem flexible, enables it to be independently operated, either to be brought toward the field of operation or retired therefrom, for supposing the operator desires to throw any one of the stems out of action, he has only to take hold of the lever 77 and move the end thereof outwardly, which will give the picker stem the inward movement, indicated by the arrow, crossing it in Fig. 4, the lever 77 taking the movement indicated by the arrow, crossing it, same figure, and the lever 82 taking the movement indicated by the arrow, crossing it, and when the act of withdrawal of the stem 85 has been accomplished to any desired degree, the spring 85 will draw the levers and pickers back into the positions they previously occupied. Or should any one of the picker stems be out of action by reason of its being too far from the center having regard to the width of that part of the cotton bush, it can be brought into the field of operation by the contrary movement of the lever 77.

The collar 80 can be set on the shaft 34 by means of the set screw 81 in any desired position, the collar 83 on the lever 82 resting on the collar 80, and being movable about the rod 34ª, so by this means the rear end of the picker stem may be adjusted up and down in the same manner as the front end, as before described.

The means for moving the picker frame will now be described. Upright standards 86 are secured upon the upper portion of the main frame section 2, and like standards 87 are supported in a like manner on the upper portion of the main frame section 1, the standards on both sides of the machine being arranged diametrically opposite each other. Within the standards 86, 87 are rotatably secured longitudinal shafts 88 to which the operating handles 89 are fixed. The shaft 88 permits both ends of the picker frame to be moved synchronously, and preserves the parallelism of both ends of the frame. The front end of the shaft 88 is provided with a downwardly extending crank arm 90 fixed to the shaft, and the rear end of said shaft is in a like manner provided with downwardly extending crank arms 91. A pitman 92 is pivotally secured to the crank arm 91 at 93, and a like pitman 94 is secured in a like manner to a crank arm 90 at 95. The guide rollers upon which the picker frame is movable are connected with a toggle joint mechanism operated by the lever 89, which toggle joint mechanism is connected and constructed as follows: The outer wheel 31 of the upper front series has a lever 96 secured upon the shaft 29, which passes through said wheel, and the outer wheel 32 of the lower set is likewise provided with a like lever 96. Another series of levers 97 are secured at one end upon the frame section 1 at 98. To the pitman 94 is pivotally secured at 99, an upright connecting rod 100, said rod being pivotally connected to the levers 96, 97 at 101, the picker frame being free to move on the tracks and within the guide provided for it, as before set forth, and the toggle joint being connected therewith, the operation of the same will move the picker frame back and forth, and project and withdraw the picker stems.

In Figs. 1 and 2 the frame has been moved out by the toggle joint mechanism to its utmost degree of projection, and in Fig. 15, it is shown as completely withdrawn.

The hackle-pins on the hackle-bars are preferably blunted at the ends, so as not to tear the leaves of the bush or become fastened in the pods, but being left sharp enough to engage the ripe cotton.

Many changes and modifications may be made in the present structure without departing from the spirit of my invention.

What I claim, and desire to secure by Letters Patent, is—

1. In a cotton harvester, the combination of a main frame, a picker frame adapted to be moved transversely of the main frame, picker stems supported by the picker frame, and adapted to be moved in the same direction, means for so moving the picker frame, and independent means for giving their movement to the picker stems, substantially as described.

2. In a cotton harvester, the combination of a main frame, picker frames having two walls of superposed and opposing picker stems, said walls or stems diverging from the rear outwardly to the front of the main frame, means for moving each picker frame independently and transversely of the main frame, and independent means for moving each individual picker stem, substantially as described.

3. In a cotton harvester, the combination with a main frame, two walls of opposing and superposed picker stems diverging from the rear outwardly to the front of the main frame, the stems having a fixed plane of movement at the forward end, and a movement at the rear end about a point movable in said fixed plane, each wall being independently movable away from the other, substantially as described.

4. In a cotton harvester, a main frame having an opening therein extending from the front to the rear thereof, picker frames supporting a series of picker stems on each side of said opening, the picker stems being arranged to form two diverging walls, extending from the rear to the front, and means whereby one picker frame can be moved to or from said opening independently of the other, substantially as described.

5. In a cotton harvester, picker stems diverging from rear to front, rotatably supported at their forward ends, and yielding connections between the rear ends and the supports for those ends, substantially as described.

6. In a cotton harvester, picker stems diverging from rear to front, each picker stem having a fixed support at its forward end, said stem being movable about the support, combined with means at its rear end for holding the stem normally in a projected position and which is adapted to yield, substantially as described.

7. In a cotton harvester, the combination with the shaft 36, and rod $34^a$ of the picker stem 40 having the outwardly extending yoke 47 and collar 48, the shaft 36 passing through said yoke, a lever 82 on the rod $34^a$, a lever 77 fulcrumed to the lever 82, one end of which is connected to the picker stem, a spring 85 secured to the rod $34^a$ and said lever 77, substantially as described.

8. In a cotton harvester, the combination with the shaft 36, and rod $34^a$ of the picker stem 40 having the yoke 47 and collar 48, the shaft 36 passing through said collar, a collar 80 set on the rod $34^a$, a lever 82 having a collar 83 about the said rod and resting on the collar 80, a lever 77 fulcrumed to the lever 82, one end of which is pivotally secured to the picker stem, the other having a spring 85 secured to the collar 80, substantially as described.

9. In a cotton harvester, the picker stem 40 having the yoke 47, a rod $33^a$ having a jaw 74, a set screw 76 for securing the jaw to the rod $33^a$, a rod $34^a$ having the collar 80 and set screw 81, the picker stem resting on the collar 80, substantially as described.

10. In a cotton harvester, the picker stem 40 having the yoke 47, a rod $33^a$ having a jaw 74, a set screw 76 for securing the jaw to the rod $33^a$, a rod $34^a$ having the collar 80 and set screw 81, and an articulated lever 77, 82 secured to the picker stem at one end, the other resting on the collar 80, substantially as described.

11. In a cotton harvester, the picker stem 40 having the yoke 47 and collar 48, a shaft 36 passing through the collar, a miter wheel 64 on the shaft 36 and adjustable on it, a miter wheel 63 on the picker stem, a rod $33^a$ having a jaw 74, a set screw 76 for securing the jaw to the rod $33^a$, a rod $34^a$ having the collar 80 and set screw 81, and an articulated lever 77, 82 secured to the picker stem at one end, the other resting on the collar 80, substantially as described.

12. In a cotton harvester, a frame for carrying picker stems, comprising top and bottom opposed cross-heads, upwardly extending bars uniting the cross-heads on each side, and horizontally extending shafts passing through the top and bottom cross-heads respectively and fast to rollers, substantially as described.

13. In a cotton harvester, a rectangular frame for carrying picker stems comprising top and bottom cross-heads set in each angle thereof, upwardly extending bars uniting the cross heads on each side, fore and aft bars uniting the cross-heads, the top and bottom cross-heads on one side having an inwardly extending arm, a bracket on one of the top cross-heads, an upright rotatable shaft set in said arms, and a picker stem geared at one end to the upright shaft, and at the other supported upon one of the upwardly extending bars, a transverse shaft having bearings in the said bracket and gearing between the upright and transverse shafts, substantially as described.

14. In a cotton harvester, a main frame having guides, combined with a picker frame comprising top and bottom opposed cross-heads, upwardly extending bars uniting the cross-heads on each side, and fore and aft extending shafts passing through the top and bottom cross-heads respectively, having rollers fast thereon, said rollers engaging the guides on the main frame, substantially as described.

15. In a cotton harvester, a picker frame comprising the top cross-heads 24, 25, bottom cross-heads 26, bosses 27 on the ends of each cross-head, upright rods 33, $33^a$ uniting the top and bottom cross-heads 24, 26, upright rods 34, $34^a$ uniting the top and bottom cross-heads 25, 26 and transverse rods connecting the top and bottom cross-heads, substantially as described.

16. In a cotton harvester, a picker frame comprising the top cross-heads 24, 25, bottom cross-heads 26, bosses 27 on the cross-heads, arms 35 on the cross-heads 24, 26, upright rods fixed to each cross-head, and upright shaft 36 rotatively secured in said arms, a picker stem in gear with the shaft 36 and supported by one of the upright rods of the opposing cross-head, cross bars connecting the top and bottom cross-heads, and means for operating the shaft 36, substantially as described.

17. In a cotton harvester, a main frame having the top guide-ways formed by the member 2 of the frame and bar 38, the lower guide 39, combined with a picker frame which comprises the top cross-heads 24, 25, bottom cross heads 26, bosses 27 on the ends of each cross-head, transverse shafts 29, 30 passing through the cross-heads and having wheels engaging with the guide ways and guide, upright rods 33, $33^a$ uniting the top and bottom cross-heads 24, 26, and upright rods 34, 34ª uniting the top and bottom cross-heads 25, 26, substantially as described.

18. The picker frame, having the top cross-heads 24, 25, bottom cross heads 26, bosses 27 on the end of each cross-head, a downwardly extending bracket 21 on the cross-head 24, an inwardly extending arm 35 having the bosses 34 on the said cross-head, upright rods 33, 34ª uniting the top and bottom cross-heads 24, 26, upright rods 34, 34ª uniting the top and bottom cross-heads 25, 26, an upright shaft 36 rotatably secured in the bosses 34, a shaft 19 in the bracket 21, transverse shafts 29, 30 extending through the cross-heads, wheels on said shafts, gearing between the shafts 19, 36 and guards for the wheels, substantially as described.

19. A picker stem 40 comprising the heads 43, 49, the head 43 having the lugs 44, 45, the head 49 having the lugs 50, 51, a cylinder 41 between the heads, and bolts 54, 55 between the lugs for holding the said cylinder in the heads, substantially as described.

20. A picker stem 40 comprising the head 43, having the outwardly extending yoke 47 and collar 48 and lugs 44, 45, a head 49 having the projection 52, eye 53, lugs 50, 51, a cylinder 41 between the heads, and bolts 54, 55 between the lugs for holding the said cylinder in the heads, substantially as described.

21. A picker stem 40, having the heads 43, 49, the head 43 having an opening through which extends the spindle 67, having at its outer end the miter wheel 63 and at the other the slotted head 67, a cam-way 57 formed between the head 43 and slotted head, a cam-way in the head 49, hackle bars 69 within the camways and engaging with the slotted head, a perforated cylinder 41 held between the heads, and radially extending hackle pins 70 on the hackle bars, aligning with the perforations in the cylinder 41, substantially as described.

22. In a cotton harvester, the combination of a main frame, a movable picker frame, guides in the main frame for the movable frame, and a toggle-joint mechanism for actuating the movable frame comprising the top and bottom articulated levers 96, 97, secured to the main and movable frames at the ends thereof, a rod 100 connecting the top and bottom levers, bearings 86 on the main frame, a transverse shaft 88 in said bearings, a crank arm 91 on said shaft, and a pitman 92, connecting the crank arm 91 and rod 100, substantially as described.

23. A picker stem having the heads 43, 49, the head 43 having the opening through which extends the spindle 62, having at its outer end the miter wheel 63 and at the other the slotted head 67, the cam-plates 57, 58 secured to said head, like parts secured to the head 49, hackle bars 69 engaging with the cam-plates and slotted heads, a perforated cylinder 41 held between the heads, and radially extending hackle pins 70 on the hackle bars, aligning with the perforations in the cylinder 41, substantially as described.

24. The combination of the heads 43, 49, the head 43 having the lugs 44, 45, the head 49 having the lugs 50, 51, a cylinder 41 between the heads, bolts 54, 55 between the lugs for holding the said cylinder in said heads, and the deflector 71 supported on the bolt 55 and adapted to be held against the outer surface of said cylinder, substantially as described.

25. The combination in superposed picker stems, each stem being supported in heads at each end thereof, longitudinal bars extending between each head of each individual picker, one bar being disposed above, and another being disposed at the side of the picker stem, the top bar of each individual picker stem being between it and the next picker stem, and the guard between any two of the picker stems and extending between the same, substantially as described.

26. The combination in superposed picker stems, each stem comprising the heads 43, 49, the head 43 having the lugs 44, 45, the head 49 having the lugs 50, 51 picking instrumentalities between the heads, bolts 54, 55 between the lugs for holding the said picking instrumentalities in place, and the plate 72 held on the bar 55 of one of the picker stems and resting against the bar 54 of another of the picker stems, substantially as described.

Signed at the city, county, and State of New York, this 7th day of August, 1891.

GEORGE LISPENARD.

Witnesses:
JOSEPH L. LEVY,
M. F. DALY.